United States Patent [19]
Beckett et al.

[11] Patent Number: 5,227,768
[45] Date of Patent: Jul. 13, 1993

[54] VIDEO INTERFACE CIRCUIT

[75] Inventors: Peter Beckett; Jack B. Lumley, both of Warton, England

[73] Assignee: British Aerospace plc, London, England

[21] Appl. No.: 697,024

[22] Filed: May 7, 1991

[30] Foreign Application Priority Data

Jun. 14, 1990 [GB] United Kingdom ................. 9013300

[51] Int. Cl.$^5$ ............................................. G09G 1/28
[52] U.S. Cl. ..................... 340/703; 340/717
[58] Field of Search ............... 340/789, 793, 717, 732, 340/703, 701

[56] References Cited
U.S. PATENT DOCUMENTS

| | | | |
|---|---|---|---|
| 4,737,772 | 4/1988 | Nishi et al. | 340/701 |
| 4,868,552 | 9/1989 | Chang | 340/703 |
| 4,965,559 | 10/1990 | Dye | 340/717 |

FOREIGN PATENT DOCUMENTS 2056813 3/1981 United Kingdom ................ 340/703

Primary Examiner—Alvin E. Oberley
Assistant Examiner—Kara Farnandez
Attorney, Agent, or Firm—Nixon & Vanderhye

[57] ABSTRACT

A video circuit which enables three full color VDU's (6a, 6b, 6c) to be driven by only one color graphics generator (2). The Circuit has many uses including the generation of head down displays for flight simulators.

6 Claims, 1 Drawing Sheet

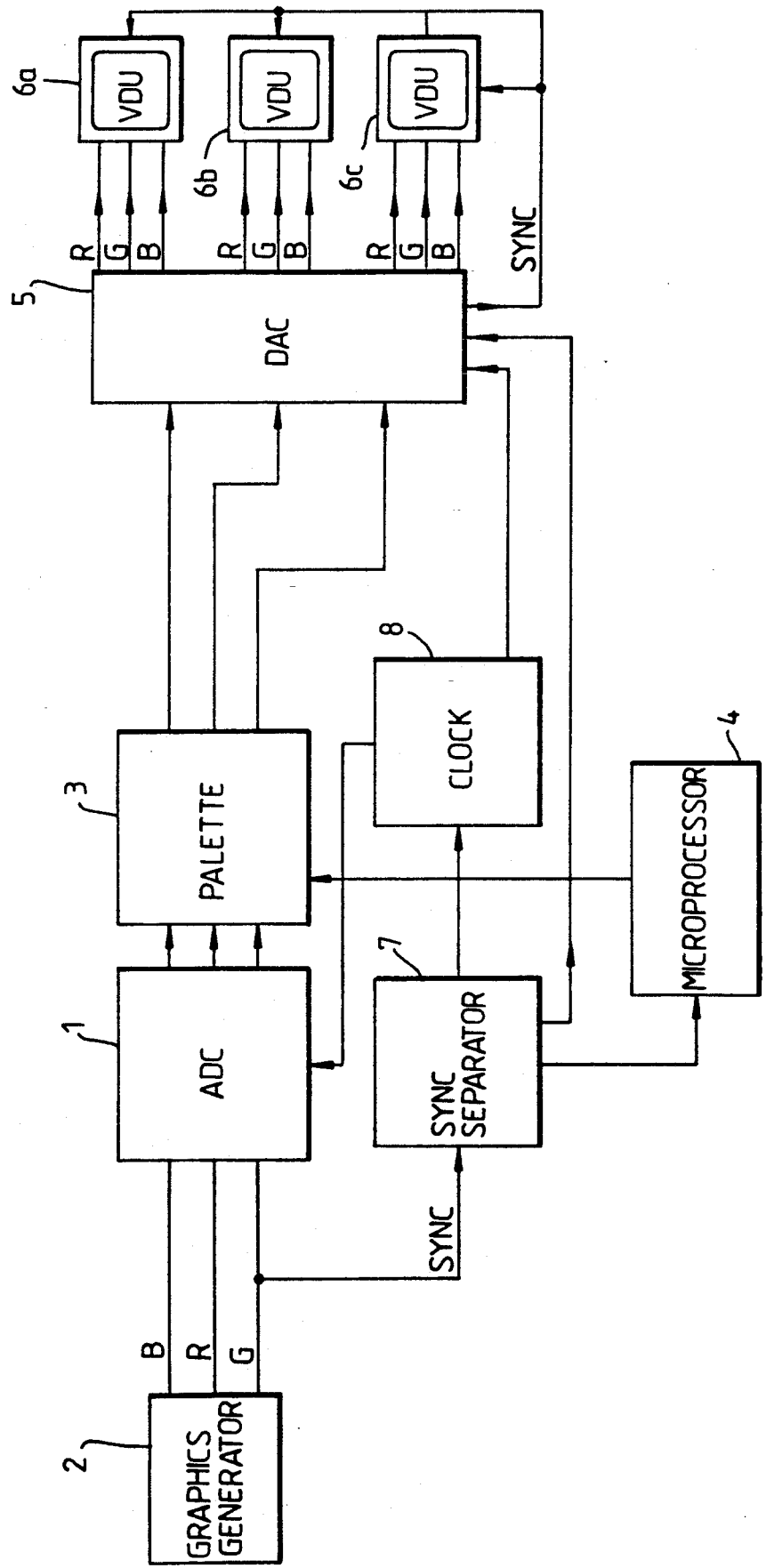

VIDEO INTERFACE CIRCUIT

BACKGROUND OF THE INVENTION

This invention relates to video circuitry and has a particular application to the generation of color displays for instrument panels used on flight simulators.

It is usual when generating full color displays for simulator use, to employ one color graphics generator per visual display unit (VDU). However, graphics generators are expensive items of equipment to purchase and maintain and therefore where several displays are required, this practice has the disadvantage of high cost.

This invention aims to provide a means whereby only one color graphics generator is required in order to drive a multiplicity of full color VDU's, thereby significantly reducing the cost of visual display generation.

SUMMARY OF THE INVENTION

The invention thus comprises a video circuit for connection to a color graphics generator which has red, green and blue video output channels of variable amplitude, the video circuit consisting of a first circuit, whose outputs are connected to a second circuit, in which the first circuit assigns a color value to the incoming signal on each video channel, dependent on the instantaneous amplitude of said signal, and the second circuit converts the assigned color values to red, green and blue video signals for connection to VDU's.

Hence three full color VDU's can be driven from just one color graphics generator. Each display can be unique by programming the graphics generator to generate three different formats in each of the three primary colors, red, green and blue. Color variations within each format are achieved by varying the intensity of each primary color as desired.

The first circuit may, for example, consist of a three-channel analogue to digital converter (ADC) and a color palette. The color palette may be controlled by a microprocessor so that one set of assigned colors may be quickly and conveniently changed to another set, if desired.

The second circuit may consist of a three channel video digital to analogue converter (DAC).

The graphics generator could be programmed to generate a single format using all three primary colors. In this case all three VDU's display the same format. However, the colors on the VDU's could differ depending on how the color palette was programmed.

BRIEF DESCRIPTION OF THE DRAWING

An embodiment of the invention will now be described, by way of example only, with reference to the drawing which is a block diagram of a video circuit in accordance with the invention.

DETAILED DESCRIPTION OF THE PREFERRED EMBODIMENT

The diagram shows an 8-bit three channel, high speed ADC 1 whose inputs are the red, green and blue output video channels from a graphics generator 2. The outputs from the ADC 1 are connected to a colour palette 3 which is under the control of a microprocessor 4. A three-channel high speed DAC 5 converts the outputs from the color palette 3 to red, green and blue video signals which in turn are connected to VDU's 6a, 6b, and 6c. A sync separator 7 and clock generator 8 ensure synchronisation between the rest of the circuitry.

In use the graphics generator 2 is programmed to generate three distinct formats in each primary color. The intensities of each color are varied across the formats as desired.

The colour palette 3 is programmed by the microprocessor 4 so that the afore-mentioned intensity variations can be translated by the palette into the desired colors for final display on each VDU 6a, 6b, and 6c.

Signals from the red, green and blue video output channels from the graphics generator 2 are then digitised by the ADC 1. The ADC 1 produces 8-bit data corresponding to the instantaneous amplitude of the video signal on each channel. The ADC 1 is clocked at the appropriate pixel rate by the clock generator 8.

The clock generator 8 is in turn synchronised to the video output channels by the sync separator 7 which receives its sync signal from the green video channel. Alternatively, the sync signal could be supplied from a separate output of the graphics generator 2.

Digital data from the ADC 1 is passed on to the palette 3. The palette allows selection of any 256 colors out of the 262,144 colors which are available on current commercially produced palettes.

Data in the palette relating colors to digitised amplitude values of the incoming video signals is controlled by the microprocessor 4 which itself is under operator control.

Signals relating to discrete colors are fed from the output of the color palette 3 to the inputs of the three channel DAC 5. The DAC 5 reconstructs the signals on its inputs into three video channels each having red, green and blue components and sync.

Input sync, blanking data and a clock signal are supplied to the DAC 5 by the clock generator 8.

Each channel is fed to a VDU 6a, 6b or 6c. Thus each of the three formats originally generated by the graphics generator are displayed on one of the VDU's 6a, 6b and 6c. Each VDU presents a full color display.

We claim:

1. A video converter circuit responsive to a color graphics generator having red, green and blue video output channels each channel having a variable amplitude, said video converter circuit including:
   a first circuit including assignment means, responsive to the instantaneous amplitude of video output in each channel, for assigning an instantaneous color value on each video channel; and
   a second circuit includes conversion means, responsive to said instantaneous color values, for converting the assigned color values to red, green and blue video signals for connection to visual display units.

2. A video converter circuit as claimed in claim 1 in which the assignment means includes a three-channel analog to digital converter and a color palette.

3. A video converter circuit as claimed in claim 2 in which the color palette is controlled by a microprocessor.

4. A video converter circuit as claimed in claim 1 in which the conversion means includes a three-channel video digital to analogue converter.

5. A video converter circuit for utilizing a single graphics generator to drive at least two separate video display units where said at least two separate video display units have at least two different display formats, where said graphics generator supplies said at least two different display formats at respective graphics generator outputs, each display format on a different color channel, said video converter circuit comprising:

A-to-D converter, responsive to signal amplitude of each of said at least two formats from said graphics generator, for providing at least two digital outputs indicative of the instantaneous amplitudes of respective graphics generator formats;

a sync separator, responsive to a sync signal generated by said graphics generator, for providing synchronization signals;

a clock, responsive to a synchronization signal from said sync separator, for clocking said A-to-D converter;

assignment means, responsive to said at least two digital outputs of said A-to-D converter, for providing at least two corresponding instantaneous digital color outputs where each of said at least two color outputs is based upon instantaneous amplitudes of said at least two digital inputs;

a microprocessor, responsive to a synchronization signal from said sync separator, for controlling a digital color output to be supplied by said assignment means in response to each of said digital outputs of said A-to-D converter;

D-to-A converter means, responsive to a synchronization signal from said sync separator, a clock signal from said clock and said digital color outputs from said assignment means, for providing separate analog channel outputs, each corresponding to one of said at least two display formats, for driving each of said at least two video display units and providing an output synchronization signal for driving each of said at least two video display units.

6. The video converter circuit according to claim 5, wherein three separate formats are generated by said graphics generator, each of said separate formats on a respective different primary color output, said A-to-D converter is responsive to said three separate primary color outputs, said assignment means is responsive to digital indications of instantaneous amplitudes of each of said three primary colors, said assignment means providing separate digital outputs based upon colors chosen by said microprocessor to correspond to specific instantaneous amplitude values in a corresponding color channel, and said D-to-A converter is responsive to said three separate channels and provides three separate analog outputs to said corresponding three video display units.

* * * * *